(12) United States Patent
Mesiwala et al.

(10) Patent No.: US 6,928,078 B2
(45) Date of Patent: Aug. 9, 2005

(54) PACKETIZED COMMUNICATIONS APPARATUS AND METHOD

(75) Inventors: Hakim Mesiwala, Cupertino, CA (US); Yi Zhang, San Jose, CA (US)

(73) Assignee: Altigen Communications, Inc., Fremont, CA (US)

( * ) Notice: Subject to any disclaimer, the term of this patent is extended or adjusted under 35 U.S.C. 154(b) by 870 days.

(21) Appl. No.: 09/738,629

(22) Filed: Dec. 14, 2000

(65) Prior Publication Data

US 2001/0050925 A1 Dec. 13, 2001

Related U.S. Application Data

(63) Continuation-in-part of application No. 09/593,822, filed on Jun. 13, 2000, now abandoned, and a continuation-in-part of application No. 09/593,821, filed on Jun. 13, 2000.

(51) Int. Cl.[7] .............................................. H04L 12/56
(52) U.S. Cl. ....................... 370/394; 370/389; 370/352
(58) Field of Search ................................ 370/394, 412, 370/235

(56) References Cited

U.S. PATENT DOCUMENTS

| | | | | |
|---|---|---|---|---|
| 6,157,653 A | * | 12/2000 | Kline et al. | 370/412 |
| 6,611,519 B1 | * | 8/2003 | Howe | 370/386 |
| 6,795,398 B1 | * | 9/2004 | Toyoda et al. | 370/231 |
| 2003/0138061 A1 | * | 7/2003 | Li | 375/326 |
| 2003/0189922 A1 | * | 10/2003 | Howe | 370/352 |
| 2004/0062248 A1 | * | 4/2004 | Nagarajan et al. | 370/394 |

* cited by examiner

Primary Examiner—Wellington Chin
Assistant Examiner—Mark A Mais
(74) Attorney, Agent, or Firm—Townsend and Townsend and Crew LLP

(57) ABSTRACT

A method for operating a telecommunications server includes receiving a plurality of data packets, each data packet including an associated chronological time stamp, storing the plurality of data packets in a first buffer, determining a first data packet from the plurality of data packets indicating a lead data packet, the first data packet stored in a first location in the first buffer, determining a timing offset in response to a chronological time stamp associated with the first data packet and a pre-determined session time stamp, storing a portion of the first data packet at a first location in a second buffer, the first location associated with the pre-determined session time stamp, retrieving a second data packet from the plurality of data packets in a second location in the first buffer, determining a session time stamp associated with the second data packet in response to a chronological time stamp associated with the second data packet and to the timing offset, storing a portion of the second data packet at a second location in the second buffer, the second location associated with the session time stamp associated with the second data packet, and retrieving the portion of the first data packet from the second buffer.

20 Claims, 9 Drawing Sheets

TIMING OFFSET = SESSION TIME STAMP - ORIGINAL TIME STAMP
TIMING OFFSET = 0 - 8080 = -8080

WRITE POINTER LOCATION = OTS + TIMING OFFSET + DELAY FACTOR
WRITE POINTER LOCATION FOR DATA 2 = 320 = 8160 - 8080 +240
WRITE POINTER LOCATION FOR DATA 5 = 560 = 8400 - 8080 +240
WRITE POINTER LOCATION FOR DATA 4 = 480 = 8320 - 8080 +240
WRITE POINTER LOCATION FOR DATA 3 = 400 = 8240 - 8080 +240

PACKETIZED COMMUNICATIONS APPARATUS AND METHOD

CROSS-REFERENCES TO RELATED APPLICATIONS

This application claims priority to U.S. application Ser. No. 09/593,822 filed Jun. 13, 2000 now abandoned and U.S. application Ser. No. 09/593,821 filed Jun. 13, 2000, hereby incorporated by reference for all purposes.

BACKGROUND OF THE INVENTION

The present invention relates to telecommunications. More specifically, the present invention relates to telephone and telecommunications systems and servers for communication across computer networks.

The prospect of consumers making a long distance call for the price of a local call has spawned the market for Internet-based telephony. There are two current techniques enabling consumers to make calls over the Internet.

One technique for internet-based telephony requires both the sending individual and the receiving individual to both have computers that are connected to the internet, and require the receiver to have a known internet address. Typically the sender types-in the receiver's known internet address, connects to the receivers computer across the internet, and when connection is made, talks to the receiver.

This technique has several draw-backs, for example, individual users typically do not have their own unique internet address. Since individual users typically connect to the internet through an internet service provider (ISP), only when the user connects, will she have a dynamically assigned internet address. Thus, in order for another individual to contact her, she must somehow transmit the dynamically assigned internet address to the calling party and then await being contacted. With this technique the call must be pre-arraigned, and is limited to person to person calls. Another drawback is that the sender and the receiver must use multimedia computers.

Another technique for internet-based telephony again requires both parties to have computers that are connected to the Internet. Initially, both parties connect to a particular host site. This host site then provides both parties with a list of users coupled to that site, such as a conventional chat room. One party then selects the other party's name from the list of names and then makes the connection.

This technique has several draw-backs including that the users must rely on a third party host site in order to make contact with each other. Another drawback is that since both parties must actively contact the site before talking to each other, the call must be pre-arraigned.

The above techniques typically rely upon packets of voice data being sent back and forth between callers across the Internet. The packets of data are then typically converted to analog form and played back to the callers. Such techniques, however, typically do not address what happens if the data packets are scrambled during the transmission process. As a result, typical communications may be garbled, may have extended periods of silence, and the like.

Some recent techniques have been developed to stream data packets across the network. Such techniques buffer a number of data packets onto the target computer before playing back the packets to the listener. This is done to ensure "smooth" playback of the data packets. Such techniques are not viable for communications across the Internet, because the latency generated by such buffering would be so large as to be considered unsuitable for communications. Further, such techniques have not based upon industry standard network transfer protocols but proprietary protocols. Because, MIS departments would have to commit additional resources to support such proprietary protocols, MIS departments typically give blanket rejections to such support requests.

Thus, in light of the above, what is needed in the industry are improved methods and apparatus for providing communications across a computer network based upon industry standard protocols.

SUMMARY OF THE INVENTION

The present invention relates to methods and apparatus for communications across a computer network. In particular, the present invention relates to novel methods and apparatus for providing telecommunications via wide area computer networks.

According to an embodiment of the present invention, a method for operating a telecommunications server includes receiving a plurality of data packets, each data packet including an associated chronological time stamp, storing the plurality of data packets in a first buffer, using a first data packet from the plurality of data packets to determine a timing offset in response to a chronological time stamp associated with the first data packet and a pre-determined session time stamp, the first data packet stored in a first location in the first buffer indicated by a read pointer. The method also includes storing at least a portion of the first data packet at a first location in a second buffer, the first location associated with the predetermined session time stamp, retrieving a second data packet from the plurality of data packets in a second location in the first buffer, and determining a session time stamp associated with the second data packet in response to a chronological time stamp associated with the second data packet and to the timing offset. Storing at least a portion of the second data packet at a second location in the second buffer, the second location associated with the session time stamp associated with the second data packet.

According to one aspect of the invention, a method for operating a telecommunications server is disclosed. The method may include receiving a plurality of data packets, each data packet including an associated chronological time stamp, storing the plurality of data packets in a first buffer, and determining a timing offset in response to a chronological time stamp associated with a first data packet, a pre-determined session time stamp and a delay factor, the first data packet from the plurality of data packets, and the first data packet stored in a first location in the first buffer. Techniques disclosed may include storing a portion of the first data packet at a first location in a second buffer, an address of the first location determined in response to the timing offset and to the chronological time stamp associated with the first data packet, retrieving a second data packet from the plurality of data packets in a second location in the first buffer, the second data packet having an associated chronological time stamp, and storing a portion of the second data packet at a second location in the second buffer, an address of the second location determined in response to the timing offset and to the chronological time stamp associated with the second data packet. Subsequent actions may include retrieving the portion of the first data packet from the second buffer.

According to another aspect of the invention, a computer program product for operating a telecommunications server is disclosed. A typical telecommunications server may include a processor, a first buffer and a second buffer. The computer program product may include code configured to direct the processor to determine a session offset in response to a chronological time stamp associated with the first data packet, to an established session time stamp and to a delay offset, the first data packet from the plurality of data packets, and the first data packet stored in a first location in the first buffer, and code configured to direct the processor to store at least a portion of the first data packet at a first location in the second buffer, an address of the first location determined in response to the session offset and to the chronological time stamp associated with the first data packet. In some embodiments, code configured to direct the processor to retrieve a second data packet from the plurality of data packets in a second location in the first buffer, the second data packet having an associated chronological time stamp, and code configured to direct the processor to determine a session time stamp associated with the second data packet, the session time stamp determined are included. The computer program product may also include code configured to direct the processor to store at least a portion of the second data packet at a second location in the second buffer, the address of the second location determined in response to the chronological time stamp associated with the second data packet and to the session offset, and code configured to direct the processor to retrieve the portion of first data packet from the second buffer. The codes may reside on a tangible media such as a computer hard drive, a ROM, a PROM, ASIC, RAM, flash memory, or the like.

According to another aspect of the invention, a telecommunications server is described that includes a processor, an input memory coupled to the processor, an output memory coupled to the processor and to the input memory; and a tangible memory coupled to the processor. In some embodiments, the tangible memory may include code that directs the processor to retrieve a first data packet from the plurality of data packets stored in the input memory, each data packet including an associated time indicator, code that directs the processor to determine a session timing offset in response to a timing indicator associated with the first data packet. to a delay factor, and to a pre-defined timing indicator, and code that directs the processor to store at least a portion of the first data packet in a first location in the output memory, the first location determined in response to the session timing offset and to the pre-defined timing indicator. In various embodiments, the tangible memory may also include code that directs the processor to receive a second data packet from the plurality of data packets, the second data packed having an associated timing indicator, code that directs the processor to determine a first session timing indicator associated with the second data packet in response to the associated timing indicator and to the session timing offset, and code that directs the processor to store at least a portion the data packet in a second location in the output memory, an address of the second location determined in response to the first session timing indicator. Code that directs the processor to retrieve the portion of the first data packet from the first location in the output memory may also be included in the tangible memory.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF SPECIFIC EMBODIMENTS

Figure 1:
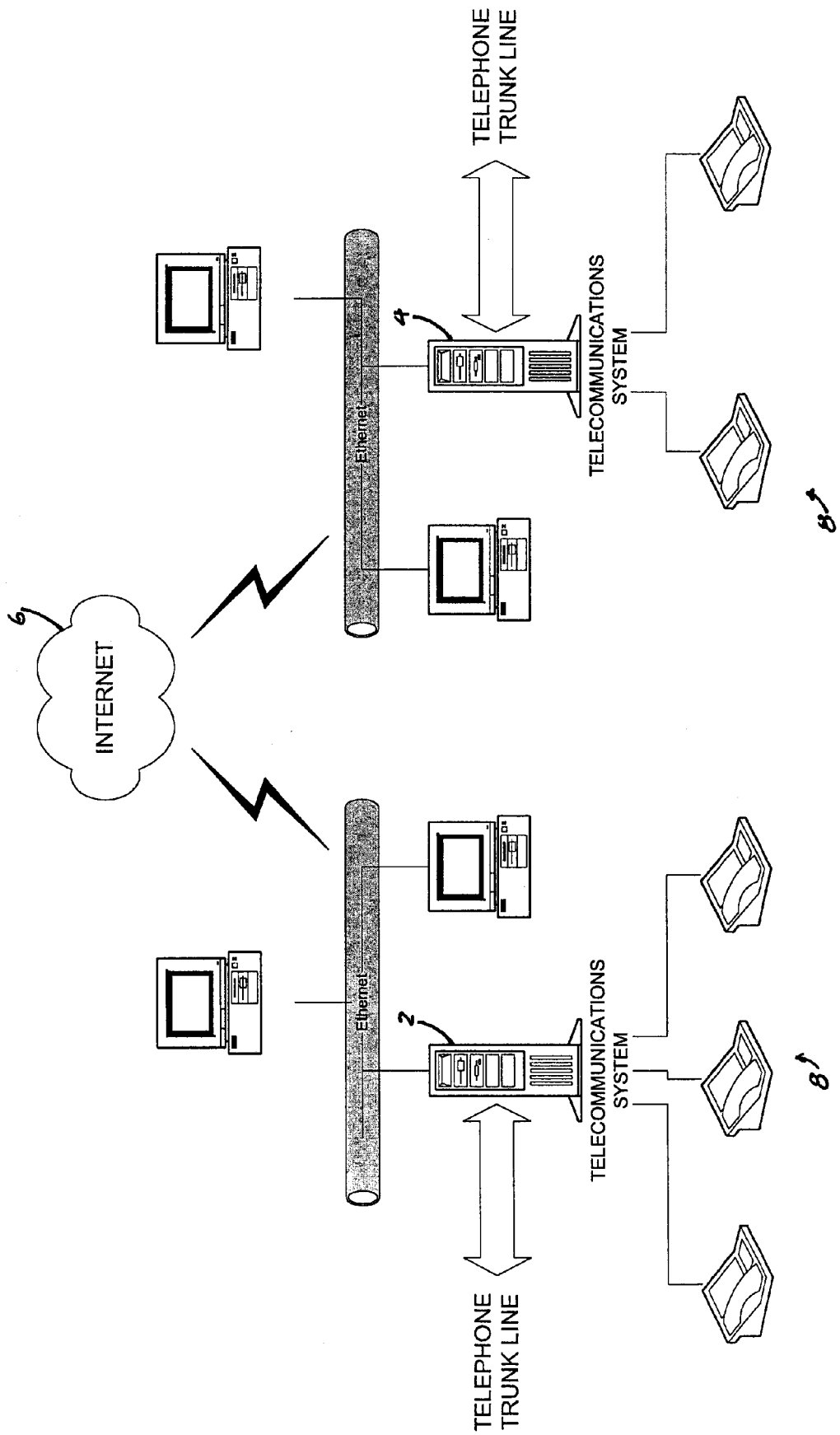
FIG. 1 is an overview block diagram of an embodiment of the present invention.

FIG. 1 is an overview block diagram of an embodiment of the present invention. FIG. 1 illustrates a telecommunications system 2 and a telecommunications system 4, coupled via a network 6.

Each telecommunications system typically provides conventional telephone service to a plurality of respective telephones 8. Further, each telecommunications system also provides telephone service across area computer networks, for example wide area networks including the Internet, internal intranets, and the like. Further description of these capabilities will be given below. Further disclosure can be found in: U.S. patent application Ser. No. 08/818,390, entitled Mixed-Media Communication Apparatus and Method, filed Mar. 14, 1997, and assigned to the present assignee. This application is hereinby incorporated by reference for all purposes.

In the present embodiment, a caller coupled to telecommunications system 2 typically picks-up the telephone handset, and dials a desired telephone number. When the telephone number is an internal extension, telecommunications system 2 couples the call to the other extension; and when the telephone number is an outside telephone number, telecommunications system 2 typically couples the call to the telephone trunk line.

When the user dials specific telephone numbers, telecommunications system 2 may determine that the most efficient method for making the telephone call is through network 6. In response, telecommunications system 2 formats the telephone call request, and sends the data to telecommunications system 4. When telecommunications system 4 receives the telephone call request, telecommunications system 4 determines the telephone number, and then rings that telephone. As before, the telephone call may be for an internal extension or for an outside telephone. When the telephone is answered, the caller and the receiver can then communicate.

In the present embodiment, as the caller or the receiver communicate, the analog data, typically their voices, are digitized and fragmented and/or converted into packets of data by the telecommunications systems. These packets of data are then passed to the other telecommunications system via computer network 6. The other telecommunications system re-assembles the data packets and converts them back into analog form.

When making a network telephone call, telecommunications system typically uses a combination of network protocols to help ensure the arrival of data across the network. For example, in the present embodiment, transmission control protocol (TCP) is used. In alternative embodiments of the present invention, other control protocols, and other combinations of control protocols may be used, for example: TCP, IP, UDP, and the like.

Figure 2:
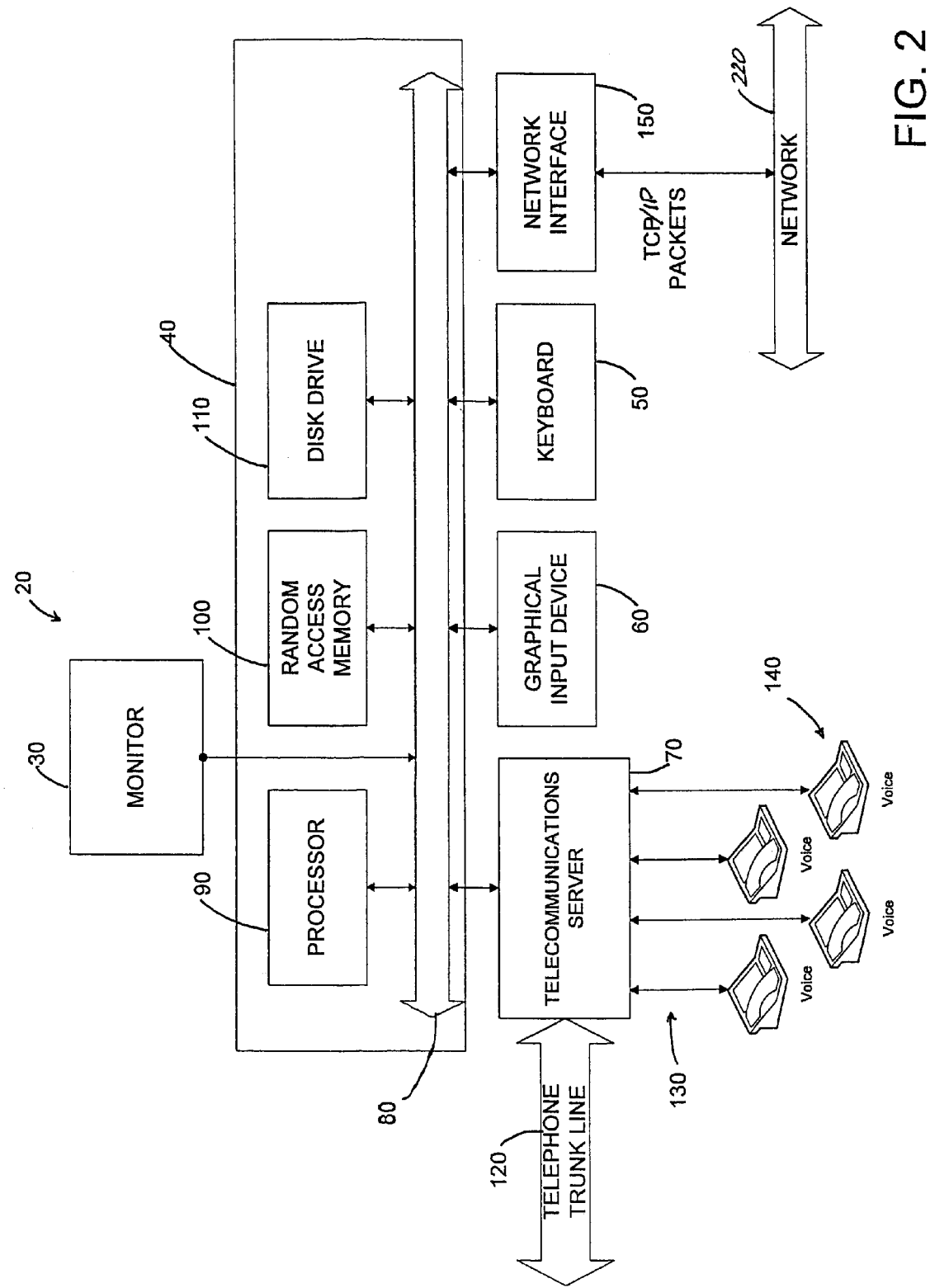
FIG. 2 is a block diagram of an embodiment of the present invention.

FIG. 2 is a block diagram of a telecommunications system 20 according to a preferred embodiment of the present invention. Telecommunications system 20 includes a monitor 30, a computer 40, a keyboard 50, an input device 60, and a telecommunications server 70. Computer 40 includes familiar computer components such as a processor 90, and memory storage devices, such as a random access memory (RAM) 100, a disk drive 110, and a system bus 80 interconnecting the above components. A telephone trunk line 120 and individual telephone lines 130 are coupled to telecommunications server 70. Handsets 140, (also telephones or telephone handsets) may be coupled to individual telephone lines 130.

Handsets 140 are preferably analog signal telephone handsets, however alternatively they may be any well known type of digital or analog telephone handset. A mouse is but one example of an input device 60, also known as a pointing device. Other types of input devices may include trackballs, drawing tablets, microphones (for voice activated input), and the like. Telecommunications system 20 may be coupled to a computer network 150 through use of a network interface 160 such as an Ethernet card, a modem, and the like.

RAM 100 and disk drive 110 are examples of tangible media for storage of data, message files, computer programs, drivers for the telecommunications server, embodiments of the herein described methods, and the like. Other types of tangible media include floppy disks, removable hard disks, optical storage media such as CD-ROMS and bar codes, and semiconductor memories such as flash memories, read-only-memories (ROMS), and battery-backed volatile memories.

In a preferred embodiment, telecommunications system 20 includes a PC compatible computer having '586 or '686 class based microprocessors, such as the Athlon™ microprocessor from AMD. Further, in the present embodiment, telecommunications system 20 utilizes the WindowsNT™ operating from Microsoft Corporation, and runs AltiWare™ IP and AltiWareOE software from AltiGen Communications, Inc. Telecommunications server 70 are preferably embodied as a Triton DSP PCI based and at least one Quantum telephony ISA based plug-in expansion boards from AltiGen Communications, Inc. These boards are also coupled to a dedicated data bus, such as the MVIP bus, or the like.

FIG. 2 is representative of but one type of system for embodying the present invention. It will be readily apparent to one of ordinary skill in the art that many system types of hardware and software configurations are suitable for use in conjunction with the present invention. For example, processor such as the G4 from Motorola, PentiumIII from Intel, and the like may be used, further any computer communications bus may be used in alternative embodiments of the present invention. Further telecommunications system 20 may operate under the LINUX operating system, may operate under MAC OS from Apple Computer, BeOS from Be, Incorporated, and the like.

Figure 3:
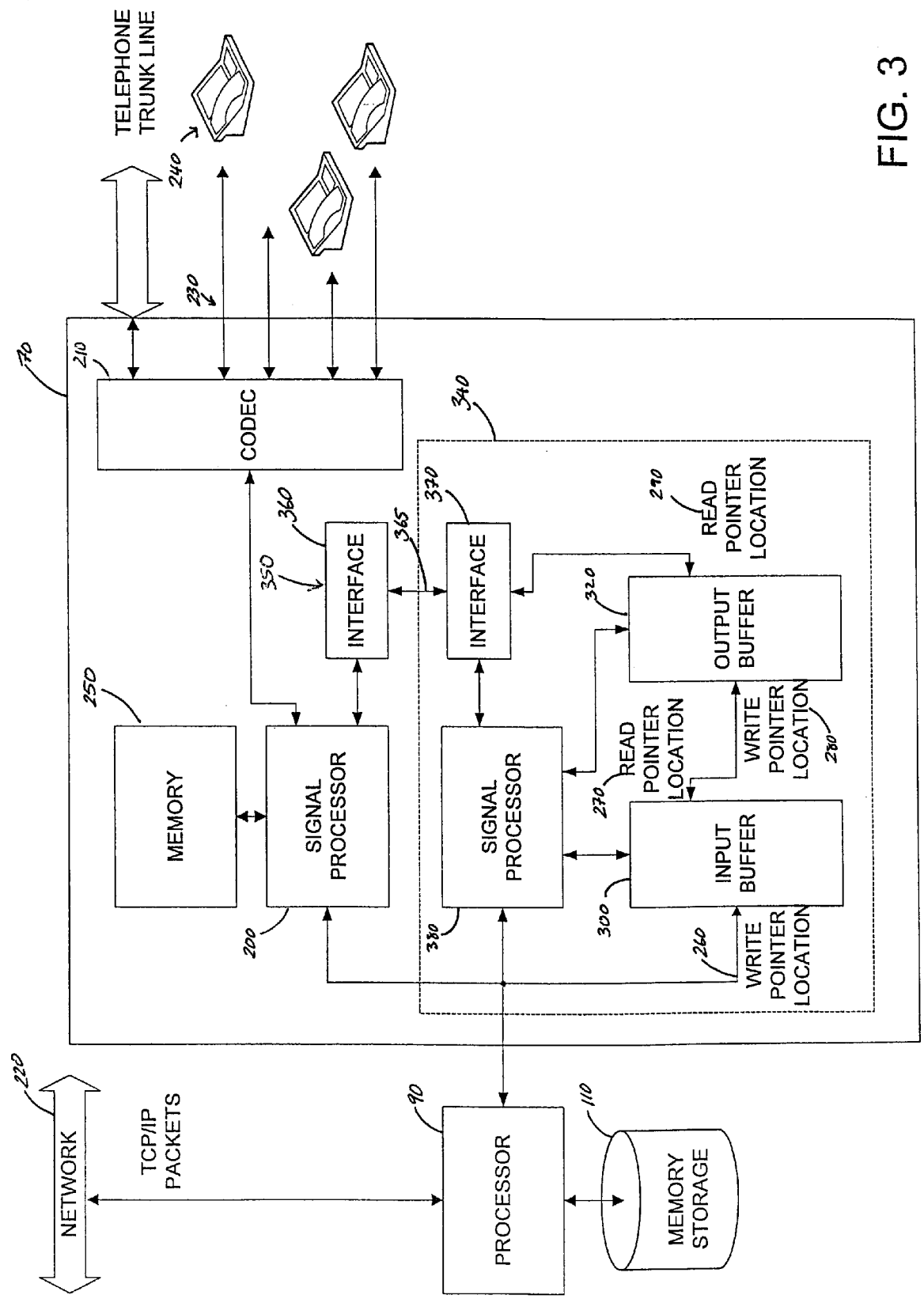
FIG. 3 is a more detailed block diagram of a portion of an embodiment of the present invention.
Figure 4A:
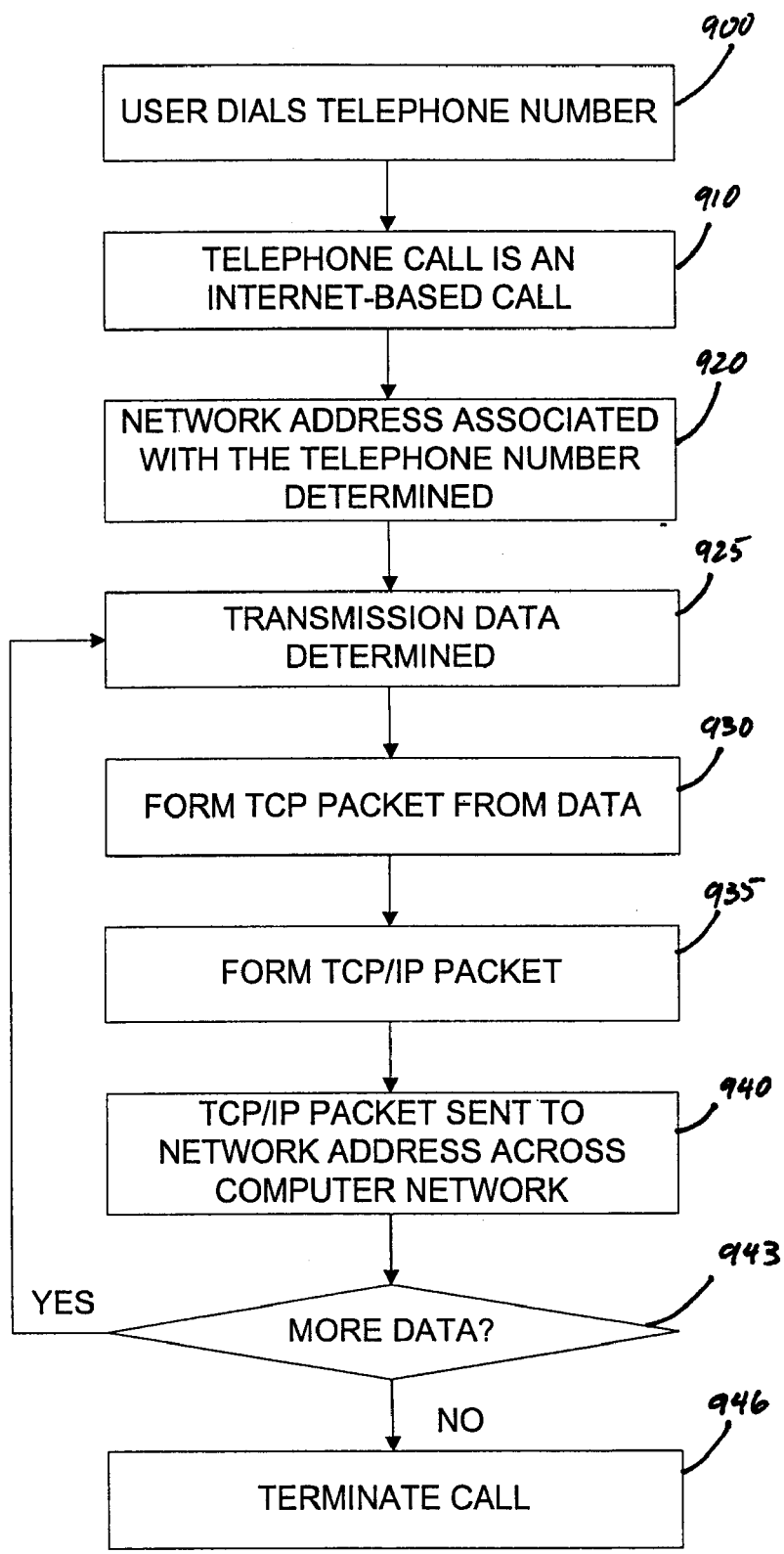
FIGS. 4A–4D illustrate flow diagrams of an embodiment of the present invention.
Figure 4B:
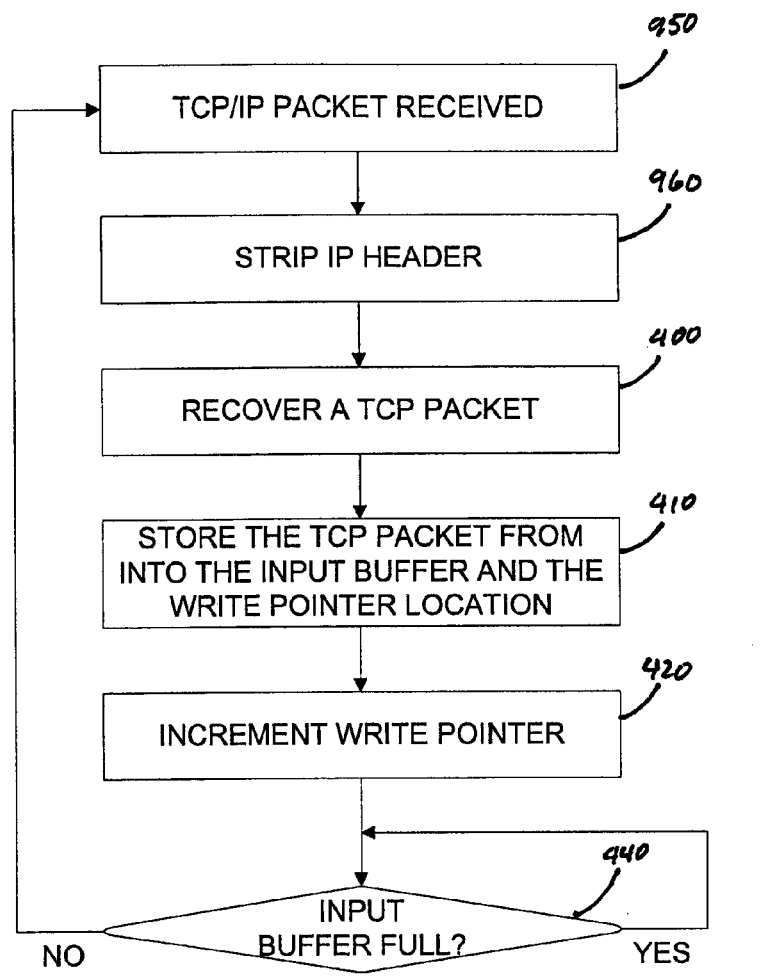
Figure 4B:
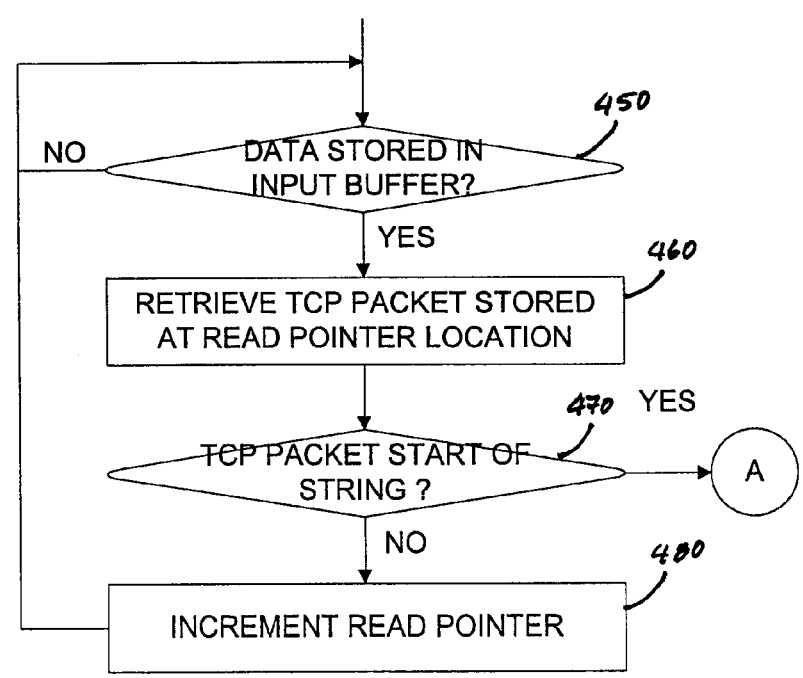
Figure 4C:
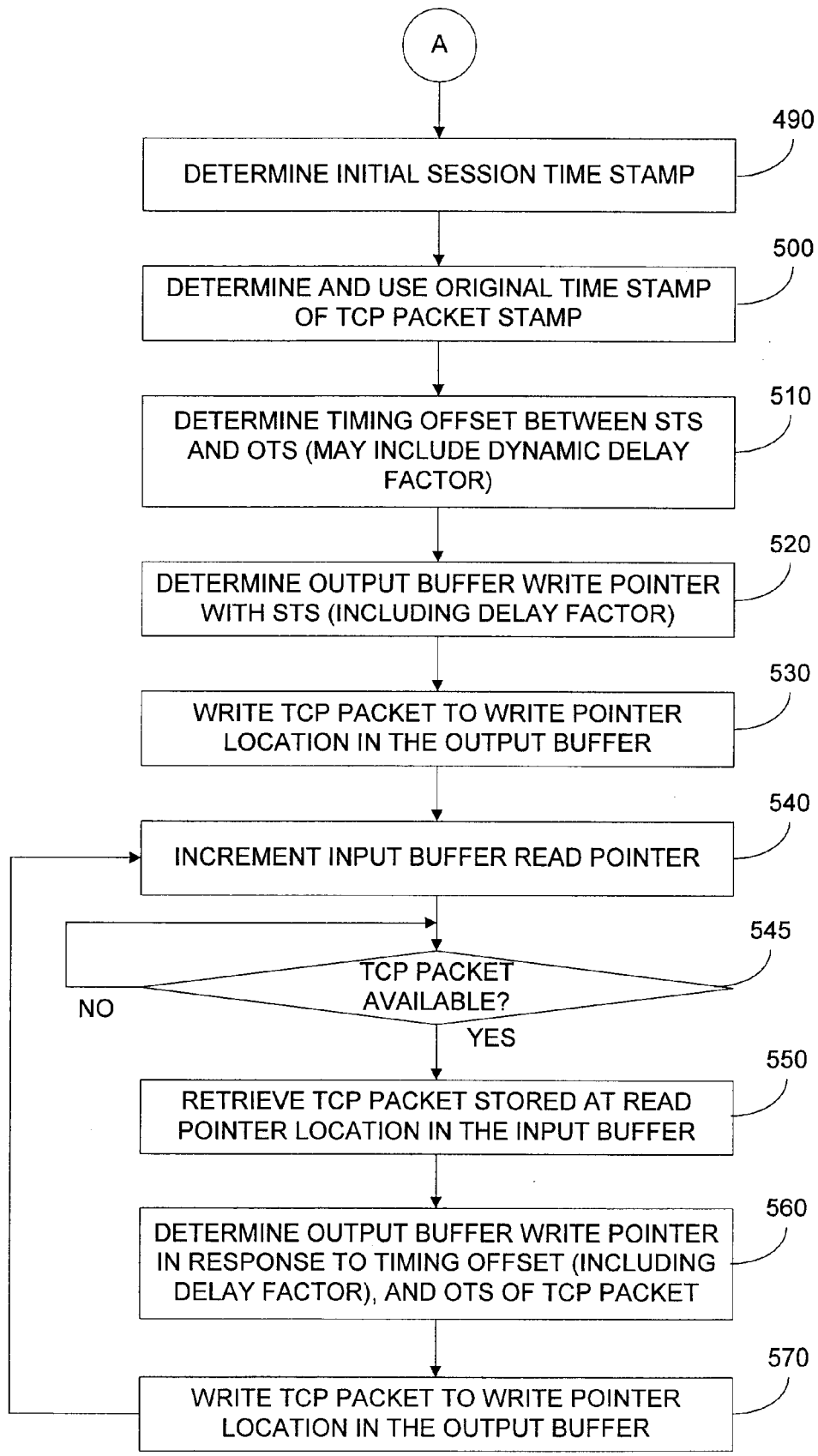
Figure 4D:
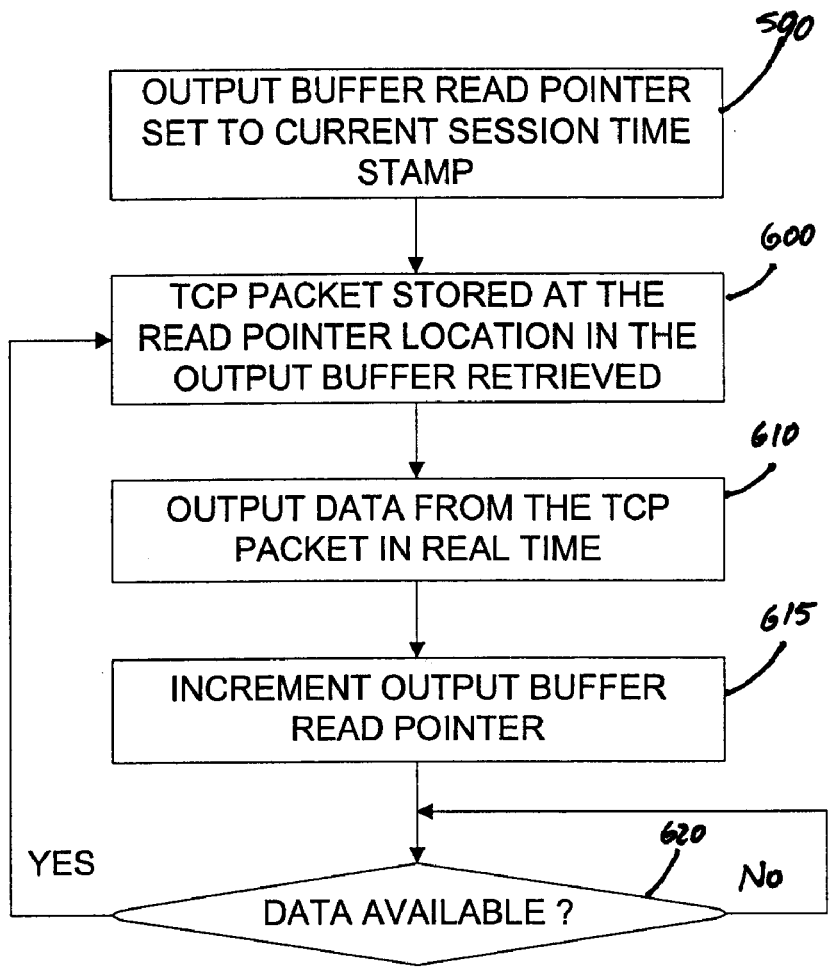

FIG. 3 is a more detailed block diagram of a portion of a telecommunications system according to an embodiment of the present invention. FIG. 3 illustrates processor 90, disk drive 110, and telecommunications server 70. In the present embodiment, telecommunications server 70 includes a signal processor 200, a digital to analog and analog to digital coder (CODEC) 210, and a memory 250. Telecommunications server 70 interfaces with telephone extension lines 230, and in turn, telephone extension lines 230 are coupled to telephone handsets 240. Processor 90 is coupled to a computer network 220, as discussed above.

In FIG. 3, processor 90 is used to control the operation of telecommunications server 70 according to instructions from the AltiWare software previously described. In one embodiment of the present invention, AltiWare software, operates in a multi-threaded multitasking environment, where each thread monitors the status of a particular telephone extension line 230. The status of the particular telephone extension line is typically represented as a state machine in the software.

In the present embodiment, processor 90 is also used to convert incoming audio messages to message files in a predefined storage format, and to convert message files and voice prompt files from predefined storage formats to an output format (typically digital signals). In the present embodiment, two specific storage format can be used for audio messages including the well-known ".wav" file format, and a pulse coded modulation scheme (PCM). The voice data is typically stored and played-back in a streaming manner.

In other embodiments of the present invention, a single storage format may be used. In other embodiments, other formats for storage of audio messages and the like are known to those of ordinary skill in the art and can be used. For example, formats such as the "RealAudio" format, from Real Networks, Inc., Motion Picture Experts Group Payer 3, MP3, G.723.1 and the like may be also be used in embodiments of the present invention.

In the present embodiment, memory storage 110 is used to store audio messages, such as voice messages, numeric telephone numbers, caller databases, voice prompt files, computer network addresses: for example IP addresses, domain names, available ports; embodiments of the present invention, e-mail addresses, data and the like.

In this embodiment, processor 90 is also used to maintain a list of telephone numbers and a mapping of these telephone numbers. In particular, processor 90 maintains a list of physical telephone extensions 230 and "virtual" telephone numbers, i.e. telephone numbers that are accessed across computer network 220. As will be described further below, when a telephone call is received, processor 90 determines whether the telephone call is a physical telephone extension or a virtual telephone number.

In the case the telephone call is for a physical telephone extension, in this example, processor 90 connects the telephone call to the appropriate telephone extension 230. In the case the telephone call is for a virtual telephone number, processor 90 initially determines a remote telecommunications system is associated with the virtual telephone number. In another embodiment, signal processor 200 maintains the list of telephone numbers and performs the mapping. In still another embodiment, processor 90 and signal processor 200 work together to maintain the list and perform the mapping.

In the present embodiment, processor 90 is also used to implement telephone call switching functionality. For example, incoming telephone calls may automatically routed to a computer process that may present the caller with a menu of options the caller may select from, and may process the caller's selections. In the present embodiment, types of switching functions that may be provided include, automatically forwarding telephone calls, transferring telephone calls, conference calls, call transferring, call forwarding, call waiting, and the like. In the present embodiment, the switching functions available are programmable by the administrator of the telecommunications system. Further, switching functions available may be programmable according to time of day, location of the caller, and the like. Other programmable functions may also include setting time-out limits and messages, setting call-back numbers, and the like.

As will be described below, packet portion 340 is used to handle packetized communications between telecommunications system and a remote telecommunication server. Similarly, as a remote telecommunications system, packet portion 340 is then used to handle communications between it and telecommunications system.

Signal processor 200 is embodied as a Texas Instruments TMS320C5X digital signal processor (DSPs), and is coupled to receive instructions, data, and the like from processor 90. Of course DSPs from other manufacturers may be used in other embodiments of the present invention. Memory 250 is used to store local instructions, voice recognition algorithms, data for signal processor 200, DTMF data, and the like.

In the present embodiment, signal processor 200 also provides telephone switching functionality to each telephone extension line. For example, in this embodiment, signal processor 200 is used to detect off-hook conditions, to provide tone generation, to detect and process key-pad (DTMF) tones generated from each telephone handset 240, to connect incoming telephone calls to appropriate extensions, and the like. Other types of switching are contemplated, such as handling incoming and outgoing trunk calls, call transfers to and from IP trunks, call forwarding, message notification, reminder calls, multi-location conferencing, call parking, call waiting, and the like. In some embodiments, signal processor 200 and/or processor 90 are both used to handle automatic call distribution, system call-backs, calling out from voice mail, boomerang, dial last caller, speed dialing, call accounting, CallerID, voice mail, mixed media messaging, MS Exchange integration, client console support, and the like.

In one embodiment, signal processor 200 is also used to provide messaging functionality, such as an implementation of a voice mail server. In particular, signal processor 200 outputs instructions, user prompts, messages from voice mail boxes, and the like, to the messaging user. Further, signal processor 200 receives function selections in the form of DTMF tones, spoken instructions, spoken messages, and the like from the messaging user. As discussed above, memory storage 110 may be used to store data associated with the messaging functionality, such as voice prompts, the incoming messages, outgoing messages, and the like.

In another embodiment, signal processor 200 is also used to convert or "recognize" particular incoming audio messages and translate the messages into a computer recognizable form. For example, signal processor 200 can recognize the spoken words "three, two, one" as the numeric number "3,2,1", e.g. ASCII character equivalents. As another example, signal processor 200 can recognize the spoken word "yes" or "ok" as an affirmative response, and "no" as a negative response. In some embodiments, signal processor 200 can use any conventional voice recognition algorithms. In embodiments destined for non-English speaking countries, voice recognition algorithms specific to the native languages may be used.

In an alternative embodiment of the present invention, processor 90 may be used to perform the voice recognition process instead of signal processor 200. In still another embodiment, the voice recognition process may be split between processor 90 and signal processor 200.

Signal processor 200 typically comprises a multi-process environment wherein each process monitors the off-hook and in some embodiments the messaging the status of a particular telephone extension line 230. The status of the particular telephone extension line in off-hook mode is represented as a state machine within signal processor 200. Further, the status of the particular telephone extension line within a voice mail messaging mode is represented as another state machine within signal processor 200. In one embodiment of the present invention, signal processor 200 can process up to twelve telephone extension lines being simultaneously in off-hook mode or in voice mail messaging mode. In alternative embodiments, monitoring of states of a greater or fewer number of telephone extension lines 230 is contemplated.

As is illustrated in FIG. 3, CODEC 210 is used to provide an interface between users on telephone extension lines 230 and signal processor 200. In the present embodiment, CODEC 210 digitizes analog messages and analog signals from users on telephone extension lines 230. CODEC 210 also converts digital signals from signal processor 200, processor 90, and the like, into analog signals for users on telephone extension lines 230. In the present embodiment, the analog signals include audio messages to and from users, dial tone and multifreqency (DTMF) tones, and the like. The analog signals also include voice prompts or phrases that provide voice prompting capability to users on telephone extension lines 230, messages recorded by users, and the like. Examples of voice prompts or phrases, include messages that instruct the user which keys on a telephone to select to perform particular functions, messages that tell the user how many messages are pending, requests for instructions, requests user input, and the like.

FIG. 3 also illustrates an interface 350 between signal processor 200 and packet portion 340. In this example, interface 350 includes interface logic 360 and 370, and physical/logical interface 365. In the present embodiment, physical/logical interface 365 follows the MVIP-90 compatible protocol, and interface logic 360 and 370 provides the appropriate signaling. In alternative embodiments of the present invention, alternative interfaces, such as specified by Dialogic, and the like may also be used.

In the present embodiment, packet portion 340 includes signal processor 380 and an input buffer 300 and an output buffer 320. Locations where input buffer 300 are written to are specified by a write pointer 260, and locations where input buffer 300 are read from are specified by a read pointer 270. Further, locations where output buffer 320 are written to are specified by a write pointer 280, and locations where output buffer 320 are read from are specified by a read pointer 290.

Signal processor 380 provides write pointer 260, read pointer 270, write pointer 280, and read pointer 290, to input buffer 300 and output buffer 320, respectively. Further, signal processor 200 stores and retrieves data from these buffers, in response to the pointer, as will be described further below. In the present embodiment, input buffer 300 is typically a 80 byte wide×20 deep buffer, and output buffer 320 is typically a 40 byte wide×80 deep buffer. These buffers may be embodied as one or more dynamic random access memories (DRAM). The buffers are typically circular, so that locations can be reused. In alternative embodiments, different sized memories can also be used.

Signal processor 380 is typically a multi-process environment. Accordingly, in the present embodiment, eight network based telephone calls can be performed at the same time. To implement this capability, input buffer 300 and output buffer 320 are typically segmented, such that each network based telephone call supported, have use of a reserved portion of the respective buffers. For example, a first telephone call is allocated use of input buffer locations 0–1023, a second telephone call is allocated use of input buffer locations 1024–2047, and the like. Further, for each network based telephone call, separate read and write pointers for each buffer may be allocated and maintained. For example, an input buffer write pointer associated with the first call may point to location 1000, whereas an input buffer write pointer associated with a second call may point to location 2000, and the like.

In this embodiment, processor 90 is also used to send and receive packets of data across network 220. This embodiment includes two types of packets, packets that include control and status data, and packets that include voice data. Typically, the control data, is used to help set up communications between a server and a client. In the present embodiment processor, 90 utilizes the Internet Protocol (IP) for enhancing packet transmission reliability over a packetized network. In a packet sending mode, processor 90 receives packets of TCP data from packet portion 340, and then divides the TCP packets into shorter packets of data. In the present embodiment, signal processor 380 provides the TCP packetizing of switching data and voice data. In this embodiment, processor 90 uses IP to format the TCP packets into TCP/IP packets and then sends the TCP/IP packets across network 220. According to TCP/IP protocol, processor 90 also monitors network 220 for ACK signals from the receiving telecommunications system. In alternative embodiments, processor 90 performs the TCP packetizing in addition to IP packetizing. In such embodiments, packet portion 340 delivers streams of digital data (such as switching data and voice data) to processor 90.

Processor 90 also receives TCP packets from packet sending telecommunications systems, and in response sends ACK signals back to the other systems. In the present embodiment, processor 90 strips IP headers from the packets and then forwards the received TCP packets to telecommunications server 70. More specifically, the TCP packets are sent to packet portion 340 for processing. In the present embodiment, processor 90 may utilize other network protocols in addition to or instead of IP, for example, UDP or the like. In the present embodiment, signal processor 380 receives the TCP packets and reassembles them into the right order. The switching and voice data recovered are then sent to signal processor 200 for further processing.

Signal processor 380 is embodied as a Texas Instruments TMS320C6201 digital signal processor (DSPs), and is coupled to receive instructions, data, and the like from processor 90, and/or signal processor 200. Of course DSPs from other manufacturers may be used in other embodiments of the present invention. In the present embodiment, memory 390 is used to store local instructions, data for signal processor 380, intermediate data, embodiments of the invention, and the like.

FIGS. 4A–4D illustrate flowcharts of an embodiment of the present invention.

Initially a user dials a number on their telephone, step 900. In the present embodiment, dialing is typically by way of the user pressing a series of DTMF keys on her telephone representing a particular telephone number. Alternatively, the user may press a series of keys providing speed dial-type capability, speak a name, a series of numbers, and the like. In another embodiment, dialing may occur by the user selecting a name, a telephone number, and the like from a list on a computer display associated with the user.

In response to the "dialed" number, within the caller's system, signal processor 200 or processor 90, determines that the telephone call should be completed across the computer network, step 910. In one embodiment, particular telephone calls are always made across the computer network. In alternative embodiments, the decision may be made depending upon time of day, long distance rates, computer network performance, and the like.

Next, the computer network address of the telecommunications system associated with the dialed number is determined, step 920. In the present embodiment, processor 90 receives the telephone number from signal processor 200. In particular, the computer network address preassociated with the telephone number is typically stored in memory storage 110 and retrieved by processor 90. In the present embodiment, the network address is an IP address. In alternative embodiments, the network address may be any number, characters, or words that represents a path to the receiving telecommunications system, for example, a domain name, a uniform resource locator (URL), or the like.

The data to be transmitted to the computer associated with the network address is then determined, step 925. One type of data is termed call set-up data. The call set-up data may include a telephone number, a connection request, a computer network address, voice data, caller identifying data such as the voice data, numeric data, ASCII data, and the like, caller telephone number, caller computer network address, and the like, DTMF tones, and the like. Another type of data may include voice data.

Processor 90 next generates groups or frames of data packets, step 930. In the present embodiment, these data packets are encoded using TCP. When each TCP packet is formed, processor 90 typically prepends a time stamp (original time stamp or OTS) indicating when the TCP packet was formed by processor 90. Typically, each TCP packet represents 10 milliseconds worth of data in the present embodiment. In the present embodiment, IP headers are typically added to each TCP packet, step 935.

Next, the TCP/IP packets that are formed are then sent across the computer network to the IP address specified, step 940. If no more data packets are to be transmitted, or the call is to be disconnected, step 943, the call is terminated, step 946. Termination typically includes hanging up the telephone, or otherwise terminating the call.

The more significant steps for the above packet transfer process have been described. However it should be understood that may steps, known to one of ordinary skill in the art have not been described, merely for sake of compactness in disclosure. For example, the intricacies of TCP acknowledgments (ACK), and the like are not described. Such steps may or may not be required when implementing alternative embodiments of the present invention.

The TCP/IP packets are received by the receiving telecommunications system, step 950. Next, the IP headers are typically stripped, step 960. After the IP headers are stripped, the frame of TCP packets is then obtained, step 400. In the present embodiment, the frame of TCP packets includes a TCP packet having one or more bits set, indicating that the TCP packet is a start for the frame of TCP packets. Each TCP packet in the frame includes optional TCP data. More specifically, each packet includes a unique original time stamp (OTS) provided by the TCP encoding host computer.

Each of the TCP packets in the frame are subsequently stored into input buffer 300 within telecommunications server 70. In particular, a first TCP packet in the frame is stored at a location in input buffer 300 specified by an input buffer write pointer, step 410. The input buffer write pointer is the incremented, step 420. This process is repeated typically until input buffer 300 is full or when all the TCP packets in the frame are stored into input buffer 300, step 440.

As disclosed above, input buffer 300 is typically a circular buffer, thus TCP packets arriving later in time than earlier TCP packets may have a physical buffer address lower than or higher than the physical addresses of later TCP packets.

Concurrently with the above steps, signal processor 380 monitors input buffer 300 for storage of TCP packets into input buffer 300, step 450. In the present embodiment, signal processor 380 monitors the input buffer write pointer and the input buffer read pointer. Typically, the input buffer read pointer points to a location in input buffer 300 other than the location specified by the input buffer write pointer when TCP data is stored into input buffer 300. When all the TCP data has been read-out of input buffer 300, the input buffer read pointer typically points to the same location as the input buffer write pointer. Other methods for indicating data are present and are contemplated in alternative embodiments of the present invention.

In the present embodiment, signal processor 380 then retrieves TCP packet stored in the location specified by the input buffer read pointer, step 460. Signal processor 380 determines whether the retrieved TCP packet indicates the start of the frame of TCP packets, step 470. If not, in one embodiment, the input buffer read pointer is incremented, step 480, and the above steps may be repeated. As discussed above, in this embodiment, a TCP packet indicates the start of a frame of packets when one or more reserved bits have been set. In some embodiments even if the TCP packet is not the start of the frame of packets, the process continues with step 490, below.

In this embodiment, signal processor 380 determines or establishes an initial session time stamp (STS) in step 490. This STS value is typically assigned the value of zero (0) merely for sake of convenience. In alternative embodiments, other initial STS values can also be used. In the present embodiment, session time stamps (STS) values are used as indices for output buffer 320, as will be described below.

In the present embodiment, output buffer 320 includes a plurality of locations. Input to a location in output buffer 320 is specified by an output buffer write pointer; and output from a location from output buffer 320 is specified by an output buffer read pointer. Locations of output buffer 320 are typically addressed by session time stamp (STS) values. As will be seen in the following example, in the present embodiment, the read pointers and write pointers are multiples of 80, to point to different locations in output buffer 320.

Next, signal processor 200 determines (or receives) the original time stamp (OTS) associated with the TCP packet determined in step 470, above, step 500. As will be discussed further below, TCP packets may include a 32-bit time stamp given by the encoding TCP host machine. Based upon the OTS and the initial STS, a timing offset is determined, step 510. In the present embodiment, the timing offset= initial STS−OTS. In another embodiment, the timing offset= initial STS−OTS+delay factor. The delay factor is typically positive and is discussed further below. However in alternative embodiments of the present invention, any combination of the values can be used such as a linear combination. In such embodiments, the output buffer should be indexed appropriately, as explained further below.

A write pointer address location is then calculated in response to the initial STS and to a delay factor, step 520. In another embodiment, where the initial STS already includes the delay factor, the write pointer address location is calculated in response to the initial STS.

In the present embodiment, the delay factor is typically on the order of 240. Since each location in output buffer 320 have addresses in multiples of 80, the delay factor translates to approximately three buffer locations. As will be illustrated below, this delay factor enables, embodiments of the present invention to account for TCP packets arriving "out of order", packet jitter, missing lead frame bit, and the like. For example, TCP packets arriving before earlier sent TCP packets can be put in their correct OTS order.

In alternative embodiments of the present invention, the delay factor may easily be increased or decreased according to implementation and performance specific considerations. For example, while a larger delay factor may increase the ability for embodiments to account for packet jitter, the larger delay factor typically translates to a caller discernable delay. In another embodiment, a delay factor need not be a constant and may be determined dynamically. Thus for example, in an embodiment where signal processor 200 determines that a great number of TCP packets are arriving out of order, the delay factor may be increased to increase the ability to play-back the data in the correct order. Further, in an embodiment where signal processor 200 determines that the TCP packets are arriving in order, the delay factor may be decreased, thus increasing user-perceived performance.

For example, when the TCP packet indicates the start of the frame of TCP packets, step 470, a delay offset, may be set to a low value. This is so because packets do not need to be placed in front of the TCP packet in the output buffer. However, if the TCP packet is not the start of the frame, a delay offset may be set to a higher value. This is so because packets such as the start of frame TCP packet, and the like need to be placed in front of the TCP packet in the output buffer. To "make more room" for the "earlier" TCP packets, more buffer locations may be reserved by increasing the delay offset value. Next, signal processor 380 directs the copying of the starting TCP packet to the address location specified by the write pointer address location, step 530. In one embodiment of the present invention, the entire starting TCP packet stored in input buffer 300 is copied to output buffer 320. In alternative embodiments of the present invention, the OTS and other TCP-related data may be stripped-off, and only the remaining data stored in output buffer 320. In still other embodiments, some TCP related data may be kept, and other data may be added to the remaining data before storage into output buffer 320.

After the starting TCP packet, or portions of the starting TCP packet have been saved into output buffer 320, the input buffer read pointer is incremented such that it points to the next location in the input buffer 300, step 540. Next, it is determined whether another TCP packet is available in input buffer 300, step 545. If so, the TCP packet stored in the next location is retrieved, step 550. This TCP packet typically also includes an original time stamp (OTS) specified by the host computer encoding the TCP packet, as described above.

In the present embodiment, the OTS for the TCP packet is then added to the timing offset and the delay factor, to form an STS value for this TCP packet, step 560. The timing offset is typically the same timing offset determined above between the OTS of the TCP packet and the initial STS. Further, the delay factor is also typically the same delay factor referred to in step 510, above. In another example, when the delay factor is part of the calculated timing offset, the STS value for the TCP packet is the OTS for the TCP packet added to the timing offset.

The STS value for this TCP packet is then used by output buffer write pointer to specify the write location into output buffer 320. This TCP packet is then stored in the write location specified by the STS value for this TCP packet, step 570. As described above, in the present embodiment, this entire TCP packet need not be stored in output buffer 320. For example, portions of the TCP packet may stripped-off, such as the OTS.

In this example, it is noted that this TCP packet may actually be out of order, e.g. arrives before an earlier sent TCP packet. The present embodiment accounts for this packet jitter by using the OTS of the TCP packet to determine the appropriate STS value. As the example below will illustrate, the output buffer write pointer may point to a location, other than an adjacent location of output buffer where the starting TCP packet was stored.

In the present embodiment, the above process is repeated typically until no more incoming TCP packets are available for reading from in input buffer 300, or until a specified number of packets are read. In the present embodiment, typically no more TCP packets are available when signal processor 380 determines that the input buffer write pointer and the input buffer read pointer point to the same location in input buffer 300.

As data is stored into output buffer 320, signal processor 380 concurrently begins outputting the data, in this embodiment. More specifically, the output buffer read pointer is initially set to the current session time stamp, step 590. The data stored in this pointer location is then retrieved, step 600, and output in real time, step 610.

The output buffer read pointer is then set to the next location in output buffer 320, step 615. These steps repeat, typically until no more data is available for output from output buffer 320, step 620.

In the present embodiment, the TCP related data is stripped out before stored into output buffer 320. The remaining data thus includes voice data and/or switching data, which is then output to the user in analog form via CODEC 210, or used by signal processor 200 for switching purposes, respectively.

Additional steps may be required to handle specific situations that may arise in alternative embodiments of the present invention. For example, when receiving a stream of TCP packets, signal processor 380 may retrieve several TCP packets from input buffer 300, before it finds a starting TCP packet, as discussed above. In such a situation, the TCP packets preceding the starting TCP packet may not copied into output buffer 320 and may be discarded. In another embodiment, signal processor 380 may retrieve several TCP packets from input buffer 300 at a time.

As another example, if an STS value for a TCP packet addresses a location in output buffer 320 that has already been accessed by signal processor 200, the TCP packet is discarded. Further, if an STS value for a TCP packet addresses a location in output buffer 320 that is not available for writing, the TCP packet may also be discarded. Alternatively, the TCP packet may be queued into a temporary memory location, until the location in output buffer 320 becomes available. An output buffer with a large number of locations may help mitigate such exceptions.

Figure 5:
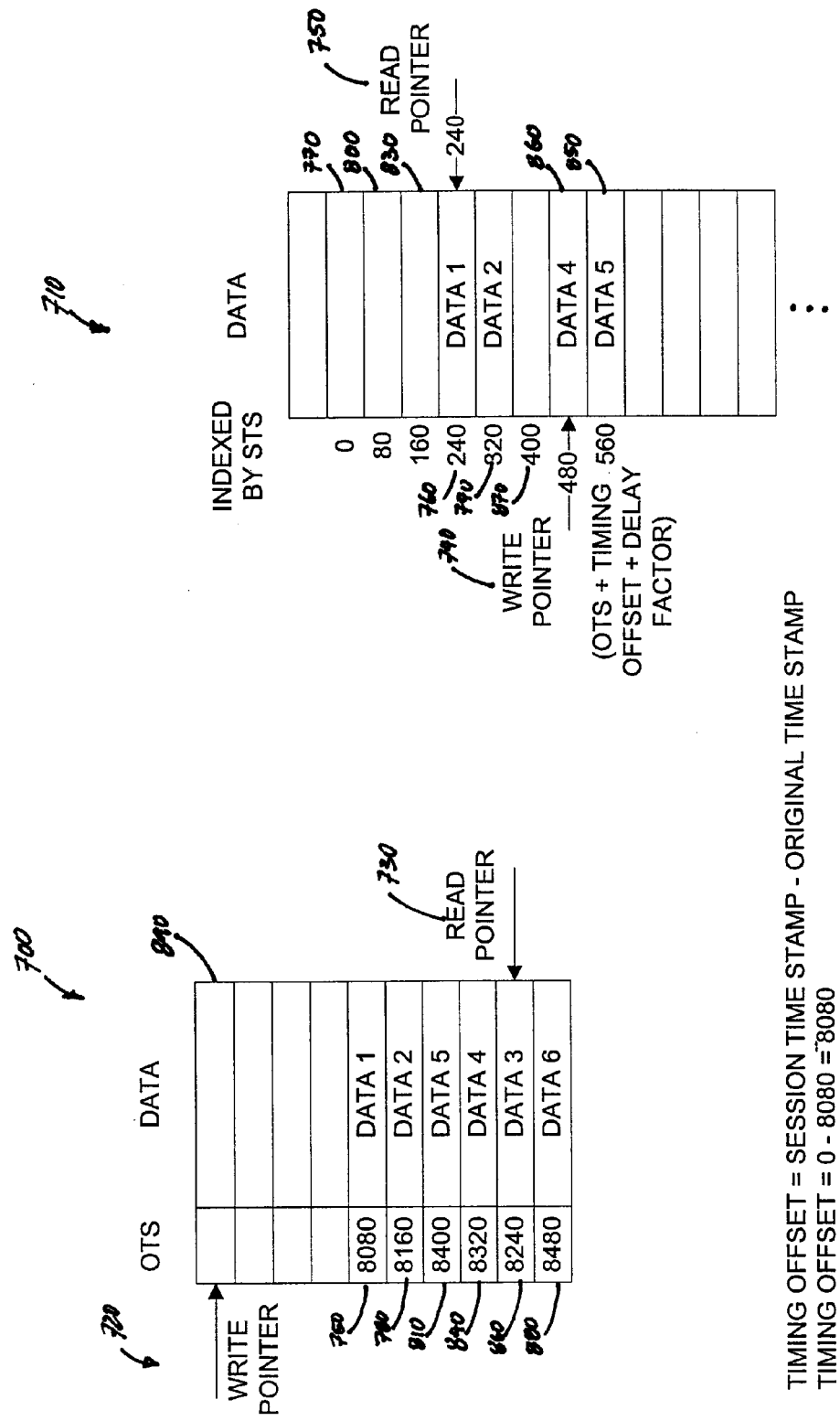
FIG. 5 illustrates an embodiment of the present invention.

FIG. 5 illustrates an example of an embodiment of the present invention. FIG. 5 includes an input buffer 700, and an output buffer 710. Data to be stored within a location into input buffer 700 is specified by a write pointer 720, and data to be read from a location from input buffer 700 is specified by a read pointer 730. Data to be stored within a location into output buffer 710 is specified by a write pointer 740, and data to be read from a location from output buffer 710 is specified by a read pointer 750.

In the present embodiment, during a typical conversation, each TCP packet is used to store 10 milliseconds of audio data. As the present embodiment is directed to storing analog telephone data, a data sampling rate of 8,000 samples per second (8 KHz) is used. This sampling rate is used to sample data from a caller and is used to play-back data in real-time to the receiver. In this example, the 80 samples of data are then stored in one TCP packet, and these 80 samples are played back to the receiver in a 10 millisecond interval. As is well known, in light of the Nyquist sampling rate or limitation, the effective data (voice signal) bandwidth is 4 KHz.

In alternative embodiments of the present invention, the sampling rate may be increased or decreased in light of the specific application, bandwidth desired, and the like. In one embodiment, the data to be transmitted is initially converted into a 64 Kbps pulse coded modulation (PCM) scheme. This PCM data, sampled every 10 ms is then packetized. In another embodiment, voice compression algorithms may be used prior to packetization. For example, one algorithm, G.723.1 compresses 64 Kbps of PCM data into 5.3/6.3 Kbps. Such an embodiment provides compressed packets at 30 ms intervals, i.e. each packet represents approximately 30 ms worth of voice data.

In the embodiment described above, each TCP packet can store 80 data samples. Because each data sample represents a point in time, two successive TCP packets store data that are offset by 80 data samples. For example, a first TCP packet may store data samples 0–79, and a second TCP packet may store data samples 80–159, and the like. Further, the original time stamps (OTS) for each TCP packet will also offset by a constant amount in the present embodiment. In the present embodiment, the difference between OTSs of adjacent TCP packets is also set to 80. In alternative embodiments of the present invention, each TCP packet may have a longer or short duration.

In alternative embodiments of the present embodiment, the OTS offset need not be the same as the data sampling rate. Such embodiments, however, may require a linear combination of the OTS, the initial STS, and a delay factor, to facilitate calculation of the STS used for write pointer 730.

Initially a first TCP packet is received by telecommunications system 20, and is stored in location 750 specified by write pointer 720 in input buffer 700. In the present embodiment, write pointer 720 is then incremented to point to location 780. In this example, each TCP packet includes original time stamps (OTS) provided by the TCP encoding computer. In FIG. 5, the OTS of the TCP packets are shown for convenience.

Next, in this example, read pointer 730 initially points to location 750. Based upon read pointer 730, signal processor 380 retrieves the first TCP data packet stored therein. Read pointer 730 is then incremented.

Next, Signal processor 380 determines that the TCP packet signals the start of a sequence of TCP packets by examining a pre-defined bit, as discussed above. In response, signal processor 200 determines a timing offset between the OTS of TCP packet and an initial session time stamp (timing offset=STS−OTS). In this example, the OTS of TCP packet 750 is 8080 and the initial STS is 0, thus the timing offset=0−8080=−8080.

Next, the address of write pointer 740 is determined (address=OTS+timing offset+delay factor). In this example, OTS=8080, the timing offset=−8080, and the delay factor is set to 240, thus the address=8080+−8080+240=240. The data portion of the TCP packet is then written into location 760, as shown.

As discussed above, in one embodiment, the timing offset between the OTS and the initial STS includes the delay factor (timing offset=STS+OTS+delay factor), thus the timing offset=0−8080+240=−7840. Accordingly, in this embodiment, the address of the write pointer is calculated= OTS+timing offset, thus the address=8080+−7840=240.

In the present embodiment, signal processor 380 begins reading out data from output buffer 710 according to the current session time stamp (STS). In particular, signal processor retrieves data from location 770 in output buffer 710, based upon read pointer 750. Because of the delay factor, this data is initially set to zero.

After the data has been read out, in the present example, read pointer 750 is incremented to point to the next location, location 800. In the present embodiment, this increment is by 80.

Next, a second TCP packet is received by telecommunications system 20, and is stored in location 780 as shown in input buffer 700. Write pointer 720 is then incremented to point to location 810.

Writing of entries into input buffer 700 typically occurs asynchronously with reading of entries from input buffer 700. Thus, in the present example, a third TCP packet is received by telecommunications system 20, and is stored in location 810; write pointer 720 is then incremented to point to location 840; a fourth TCP packet is received by telecommunications system 20, and is stored in location 840; and write pointer 720 is then incremented to point to location 860.

Next, based on the value of read pointer 730, signal processor 380 retrieves the second TCP data packet stored therein. Read pointer 730 is then set to point to location 810. Subsequently, the address of write pointer 740 is determined (address=OTS+timing offset+delay factor). In this example, OTS=8160, the timing offset=−8080, and the delay factor is 240, thus the address=8160+−8080+240=320. The data portion of the second TCP packet is then written into location 790, as shown. In the embodiment where the timing offset includes the delay factor, the address=OTS+timing offset, thus the address=8160+−7840=320.

Writing of entries into output buffer 710 typically occurs asynchronously with reading of entries from output buffer 710. Thus, in this example the following steps may also be accomplished: based on the value of read pointer 730, signal processor 200 retrieves the third TCP data packet stored therein. Read pointer 730 is then set to point to location 840. Subsequently, the address of write pointer 740 is determined (address=OTS+timing offset+delay factor). In this example, OTS=8400, the timing offset=−8080, and the delay factor is 240, thus the address=8400+−8080+240=560. The data portion of the third TCP packet is then written into location 850, as shown. In the embodiment where the timing offset includes the delay factor, the address=OTS+timing offset, thus the address=8400+−7840=560.

Asynchronously, signal processor 380 retrieves data from location 800 in output buffer 710, based upon read pointer 750. Again, because of the delay factor, this data is initially set to zero. After the data has been read out, in the present example, read pointer 750 is incremented to point to the next location, location 830.

Next, asynchronously with reading of entries from input buffer 700, a fifth TCP packet is received by telecommunications system 20, and is stored in location 860; write pointer 720 is then incremented to point to location 880; a sixth TCP packet is received by telecommunications system 20, and is stored in location 880; and write pointer 720 is then incremented to point to location 890.

Next, based on the value of read pointer 730, signal processor 380 retrieves the fourth TCP data packet stored therein. Read pointer 730 is then set to point to location 860. Subsequently, the address of write pointer 740 is determined (address=OTS+timing offset+delay factor). In this example, OTS=8320, the timing offset=−8080, and the delay factor is 240, thus the address=8320+−8080+240=480. The data portion of the TCP packet is then written into location 860, as shown. In the example where the timing offset includes the delay factor, the address=OTS+timing offset, thus the address=8320+−7840=480.

Asynchronously, signal processor 380 retrieves data from location 830 in output buffer 710, based upon read pointer 750. Again, because of the delay factor, this data is initially set to zero. After the data has been read out, in the present example, read pointer 750 is incremented to point to the next location, location 760. Next, signal processor 200 retrieves the data, DATA 1, from location 760 in output buffer 710, based upon read pointer 750. As can be seen, location 760 includes data from the TCP packets. This stream of digital data will then be converted by CODEC 210 to analog form, and then played to the user. After the data has been read out, in the present example, read pointer 750 is incremented to point to the next location, location 790. Alternatively, DATA1 may represent a telephone number or other data used by signal processor 200.

Continuing the example described above, it can be seen that location 860 includes a fifth TCP packet (including DATA 3) that includes an OTS that indicates that it was sent before the third and fourth TCP packets. As can be determined by calculation, the address for write pointer 740 will be location 400 (400=8240+−8080+240). As a result, DATA 3 will be placed in the correct order in output buffer 710, before DATA 4 and DATA 5. When playing out data to the user, the stream of data will then be in the correct order: DATA 2, DATA 3, DATA 4, and the like. In the example where the timing offset includes the delay factor, the address=OTS+timing offset, thus the address=8240+−7840= 400.

In the case where a TCP packet is missing from output buffer 710 when it is time to output the TCP packet, various techniques have been developed. For example, in one embodiment, the last TCP packet output is again output. In another embodiment, some interpolation is performed between the TCP packets around the missing TCP packet. In still other embodiments other techniques may be envisioned. If the TCP packet arrives after it is "played," typically that TCP packet is simply discarded.

In this embodiment, to facilitate reading out of TCP packets from input buffer 700, in the present embodiment, output buffer 710 includes more buffer locations than input buffer 700. Specifically, in the present embodiment, output buffer 710 includes more than twenty (20) addressable locations in memory. In embodiments where output buffer 710 is smaller, the rate at which TCP packets arrive for storage into input buffer 700 may exceed the rate at which TCP packets are read from input buffer 700. As a result, incoming TCP packets may have to be discarded, or alternatively may write over other stored TCP packets. As is also evident, in embodiments where output buffer 10 is smaller, some incoming TCP packets may have to be discarded if the rate of arrival of packets input buffer 700 temporarily exceeds the constant rate at which data is read from output buffer 710.

In one embodiment of the present invention, steps 490–530 need not only be performed upon determination of a starting TCP packet in step 470. Instead, the steps of determining a timing offset may be performed at particular intervals. For example, these steps can be performed for any TCP packet every 5 seconds, every 10 seconds, every minute, whenever the timing offset needs to be determined, and the like.

In one embodiment of the present invention, two modes are provided, an acquisition mode and a tracking (steady-state) mode. During the acquisition mode, determining an updated timing offset may occur every 1 second; and during a tracking (steady-state) mode, determining an updated timing offset may occur every 30 seconds. Such an embodiment may begin in an acquisition mode, and if the updated timing offsets are consistent for a pre-determined amount of time or number of calculations, the embodiment enters the tracking (steady-state) mode. If the updated timing offsets become inconsistent, the embodiment may re-enter the acquisition mode.

In the present embodiment, if a previous timing offset and a subsequent updated timing offset are different, the updated timing offset is recalculated and used for the calculation of the output buffer write pointer in step 560. In alternative embodiments of the present invention, the timing offset used in step 560 may be an average or any other combination of the previous timing offset and the updated timing offset.

Figure 6:
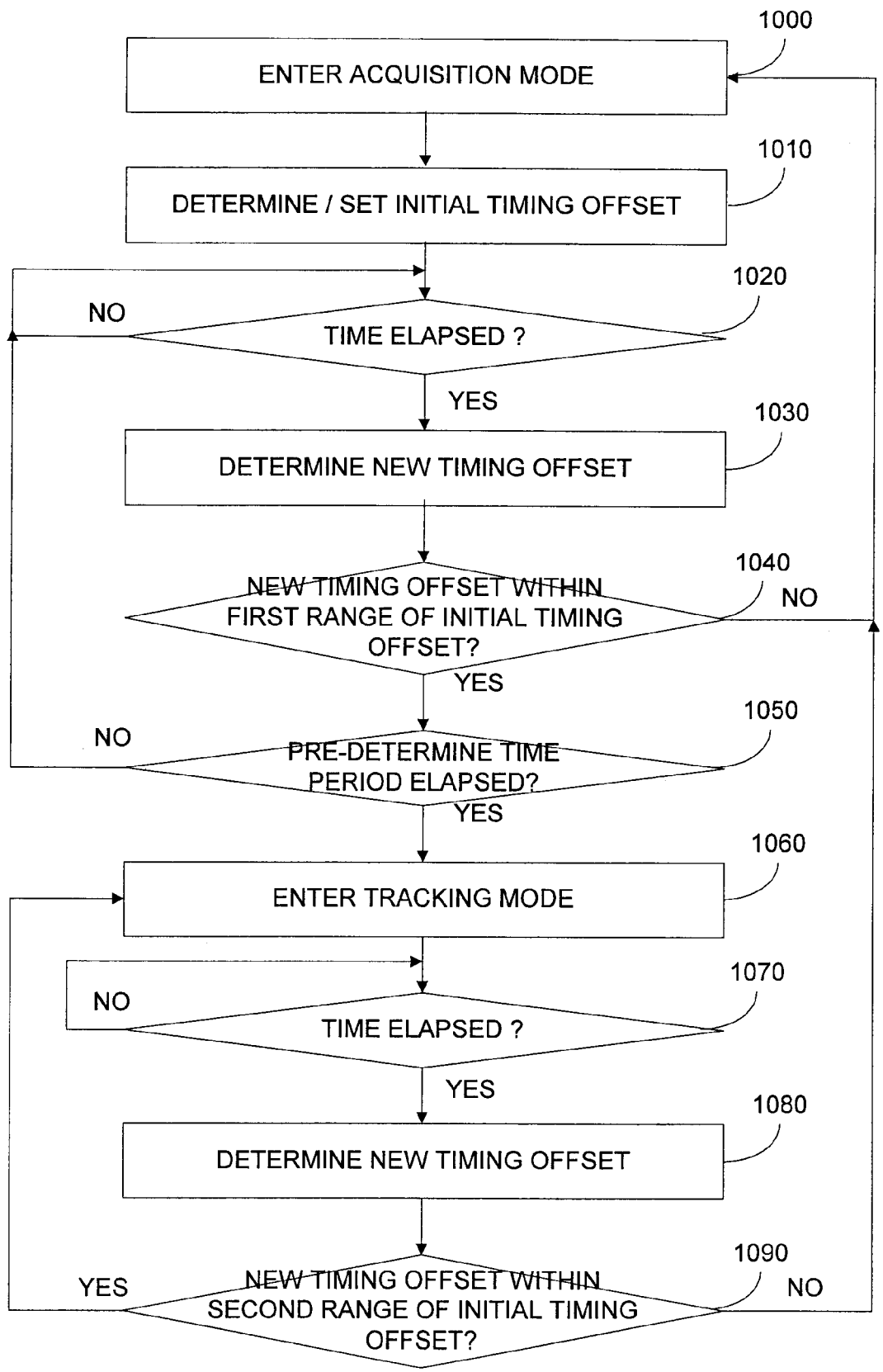
FIG. 6 illustrates a flow diagram of an embodiment of the present invention.

FIG. 6 illustrates a flow chart according to an embodiment of the present invention. In particular, FIG. 6 highlights the steps described above.

Initially the system typically begins in the acquisition mode, step 1000, as described above. Next, the initial timing offset is determined, step 1010, see FIGS. 4B and 4C. As discussed above, after an amount of time, such as 1 second, step 1020, an updated timing offset is re-determined, step 1030.

The previous paragraphs describe that the updated timing offset is compared to the initial timing offset, step 1040 and if the two values are outside a range, the updated timing offset is used or the initial timing offset is redetermined. If the two values are within a range for a pre-determined amount of time, step 1050, the system may enter a tracking mode, as described above, step 1060.

Next, as discussed above, after an amount of time, such as 30 seconds, step 1070, an updated timing offset is re-determined, step 1080.

The above paragraphs describe that the updated timing offset is compared to the initial timing offset, step 1090, and if the two values are within a range, the system stays in the tracking mode and the updated timing offset may be used. If the two values are not within a range, the system reenters the acquisition mode. In such a case the updated timing offset may be used or an initial timing offset can be re-determined and used. Thus, when the network performance is poor and there is large packet jitter, the system will typically be in the Acquisition mode. Further, when the network performance is good and there is low packet jitter, the system will typically be within the Tracking mode. These embodiments allow the system to dynamically adjust its performance in light of the network performance.

Conclusion

In the foregoing specification, the invention has been described with reference to specific exemplary embodiments thereof. Many changes or modifications are readily envisioned. For example, the amount of time delay may range from 40 milliseconds to 120 milliseconds. Further, a dynamic delay factor may be used. Further, the network utilized may include the Internet, an internal IP based network, an IPX network, and the like. Further, sizes allocated for the input and the output buffers, as well as the delay factor, may be changed, depending upon level of performance and reliability required. In alternative embodiments, any type of network protocol may be used. besides TCP.

Further, in alternative embodiments of the present invention several input buffer locations are read-out in a short period of time, instead of one at a time, as described above. When writing data to output buffer, the addresses for the output buffer write pointer is simply incremented, and not indexed based upon calculated STS value. In such embodiments, the OTS for the TCP packets stored in the several input buffer locations are analyzed. The TCP packet having the lowest OTS value is then written into the output buffer location indicated by next location specified by the output buffer write pointer. The output buffer write pointer is incremented and then the process is repeat. This embodiment facilitates the filling of output buffer locations by filling the output buffer, without gaps, with chronologically ordered TCP packets. In such embodiments, TCP packets may also be missing.

In the present embodiment, the above processes to fill and to read data entries from the input buffer and the output buffer are described sequentially. However, it should be understood that many of the described processes are executable in parallel or concurrently.

The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for operating a telecommunications apparatus comprises:
    receiving a plurality of data packets, each data packet including an associated received time stamp;
    storing the plurality of data packets in a first buffer;
    determining a timing offset in response to a received time stamp associated with a first data packet, a pre-determined session time stamp and a delay factor, the first data packet being from the plurality of data packets and stored in a first location in the first buffer;
    storing a portion of the first data packet at a first location in a second buffer, an address of the first location determined in response to the timing offset and to the received time stamp associated with the first data packet;
    retrieving a second data packet from the plurality of data packets in a second location in the first buffer, the second data packet having an associated received time stamp;

storing a portion of the second data packet at a second location in the second buffer, an address of the second location determined in response to the timing offset and to the received time stamp associated with the second data packet; and retrieving the portion of the first data packet from the second buffer.

2. The method of claim 1 wherein the first location in the first buffer is adjacent to the second location in the first buffer.

3. The method of claim 1 wherein the first location in the second buffer is not adjacent to the second location in the second buffer.

4. The method of claim 1 wherein the address of the second location in the second buffer is larger than the address of the first location in the second buffer.

5. The method of claim 1 wherein the address of the second location in the second buffer is smaller than the address of the first location in the second buffer.

6. The method of claim 1 wherein the plurality of data packets includes a lead data packet and non-lead data packets; and wherein a value of the delay factor is different when the first data packet is the lead data packet or when the first data packet is a non-lead data packet.

7. The method of claim 1 further comprising:

retrieving a third data packet from the plurality of data packets in a third location in the first buffer, the third data packet having an associated received time stamp;

storing a portion of the third data packet at a third location in the second buffer, an address of the third location determined in response to the timing offset and to the received time stamp associated with the third data packet; and thereafter retrieving the portion of the second data packet from the second buffer.

8. A computer program product for operating a telecommunications apparatus including a processor, a first buffer and a second buffer, comprises:

code configured to direct the processor to store a plurality of data packets including a first data packet and a second data packet, each data packet including an associated received time stamp;

code configured to direct the processor to determine a session offset in response to a received time stamp associated with the first data packet, to an established session time stamp and to a delay offset, the first data packet stored in a first location in the first buffer;

code configured to direct the processor to store at least a portion of the first data packet at a first location in the second buffer, an address of the first location determined in response to the session offset and to the received time stamp associated with the first data packet;

code configured to direct the processor to retrieve a second data packet from the plurality of data packets from a second location in the first buffer, the second data packet having an associated received time stamp;

code configured to direct the processor to store at least a portion of the second data packet at a second location in the second buffer, the address of the second location determined in response to the received time stamp associated with the second data packet and to the session offset; and code configured to direct the processor to retrieve the portion of first data packet from the second buffer;

wherein the codes reside on a tangible media.

9. The computer program product of claim 8 wherein the first location in the second buffer is adjacent to the second location in the second buffer.

10. The computer program product of claim 8 wherein at least one location is between the first location in the second buffer and the second location in the second buffer.

11. The computer program product of claim 8 wherein the second location in the second buffer has an address higher than the first location in the second buffer.

12. The computer program product of claim 8 further comprising:

code that directs the processor to determine whether the first data packet is a lead data packet or a non-lead data packet;

code that directs the processor to use a first value for the delay offset when the first data packet is a lead data packet; and code that directs the processor to use a second value for the delay offset when the first data packet is a non-lead data packet.

13. The computer program product of claim 8 further comprising:

code configured to direct the processor to retrieve a third data packet from the plurality of data packets in a third location in the first buffer, the third data packet having an associated received time stamp;

code configured to direct the processor to store a portion of the third data packet at a third location in the second buffer, an address of the third location determined in response to the session offset and to the received time stamp associated with the third data packet; and code configured to direct the processor to retrieve a portion of the second data packet from the second buffer.

14. A telecommunications apparatus comprises:

a processor;

an input memory coupled to the processor;

an output memory coupled to the processor and to the input memory; and a tangible memory coupled to the processor, comprising:

code that directs the processor to retrieve a first data packet from the plurality of data packets stored in the input memory, each data packet including a remote time indicator associated therewith;

code that directs the processor to determine a session timing offset in response to a timing indicator associated with the first data packet, to a delay factor, and to a pre-defined session timing indicator;

code that directs the processor to store at least a portion of the first data packet in a first location in the output memory corresponding to a first calculated session timestamp, the first calculated session time stamp determined in response to the session timing offset and to the remote time indicator associated with the first data packet;

code that directs the processor to receive a second data packet from the plurality of data packets, the second data packet having a timing indicator associated therewith; and code that directs the processor to store at least a portion the second data packet in a second location in the output memory corresponding to a second calculated session time stamp, the second calculated session time stamp determined in response to the session timing offset and the timing indicator associated with the second data packet.

15. The telecommunications apparatus of claim 14 wherein the first location is adjacent to the second location in the output memory.

16. The telecommunications apparatus of claim 14 wherein there is at least one location between the first location in the output memory and the second location in the output memory.

17. The telecommunications apparatus of claim 16 wherein the tangible memory also includes code that directs the processor to retrieve the portion of the first data packet from the output memory.

18. The telecommunications apparatus of claim 14 wherein an address of the second location in the output memory is lower than an address of the first location in the output memory.

19. The telecommunications apparatus of claim 14 wherein the tangible memory also includes:

code that directs the processor to determine whether the first data packet is a lead data packet or a non-lead data packet; and code that directs the processor to determine a value for the delay factor depending on whether the first data packet is the lead data packet or a non-lead data packet.

20. The telecommunications apparatus of claim 14 wherein the tangible memory also includes:

code that directs the processor to receive a third data packet from the plurality of data packets having a timing indicator associated therewith;

code that directs the processor to store at least a portion of the third data packet in a third location in the output memory corresponding to a third calculated session time stamp, the third calculated session time stamp determined in response to the session timing offset and the timing indicator associated with the third data packet; and code that directs the processor to retrieve the portion of data packet from the output memory.

\* \* \* \* \*